Figures 1, 2:
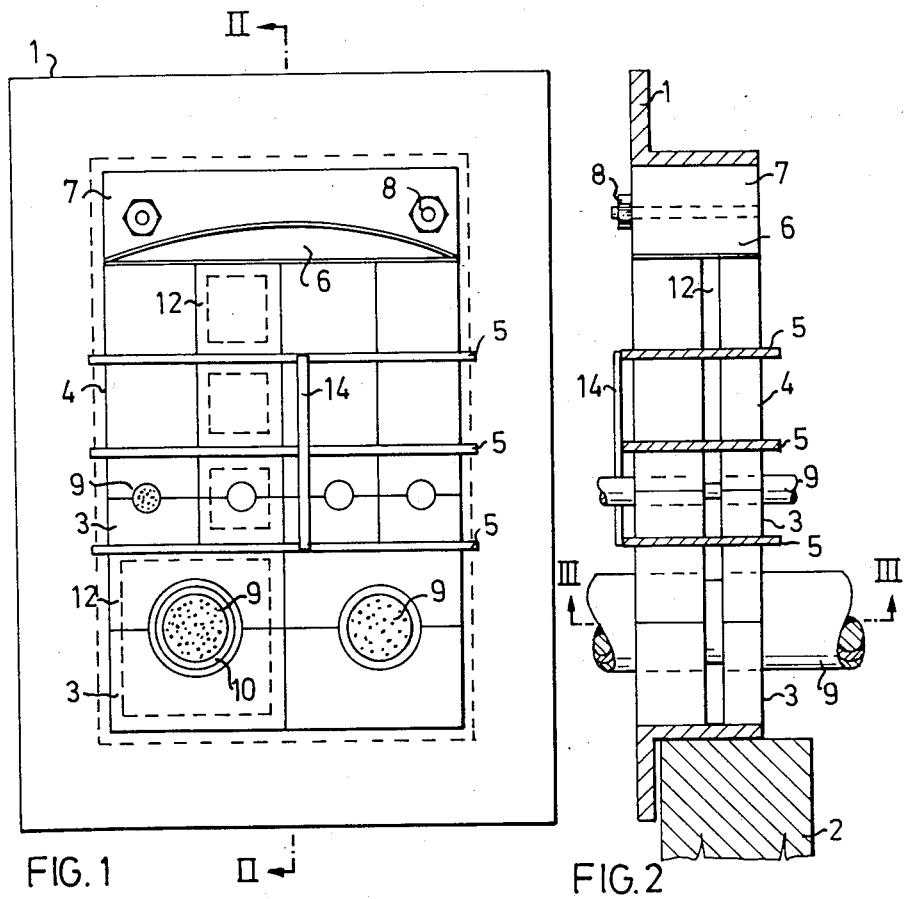

United States Patent [19]

Blomqvist

[11] Patent Number: 4,677,253
[45] Date of Patent: Jun. 30, 1987

[54] RADIATION PROTECTIVE DEVICE FOR THE LEAD-THROUGH OF CABLES

[75] Inventor: Erik M. Blomqvist, Karlskrona, Sweden

[73] Assignee: AB Lyckeaborg Bruk, Karlskrona, Sweden

[21] Appl. No.: 714,860

[22] Filed: Mar. 22, 1985

[30] Foreign Application Priority Data

Mar. 23, 1984 [SE] Sweden ............................ 8401634

[51] Int. Cl.[4] ............................................. H05K 9/00
[52] U.S. Cl. .................................. 174/35 R; 174/48; 174/65 R
[58] Field of Search ................. 174/35 R, 65 R, 48, 174/35 MS; 248/56

[56] References Cited

U.S. PATENT DOCUMENTS

| | | | |
|---|---|---|---|
| 3,282,544 | 11/1966 | Brattberg | 248/56 |
| 3,830,954 | 8/1974 | Caudill | 248/56 X |
| 4,498,546 | 2/1985 | Peterson | 175/35 R |

FOREIGN PATENT DOCUMENTS 2909890 9/1980 Fed. Rep. of Germany .
152815 12/1955 Sweden .

Primary Examiner—Arthur T. Grimley
Assistant Examiner—D. A. Tone
Attorney, Agent, or Firm—Cushman, Darby & Cushman

[57] ABSTRACT

A radiation protective device for a fire-protecting lead-through intended to accommodate electric, metal-encased cables passing through a metal wall, said lead-through comprising a frame having its opening filled with packing pieces, stay strips and an arrangement for compressing the block formed of the packing pieces, the protective device including metal shield plates inserted in their respective packing piece in a plane parallel with the packing piece block and covering, together with the through-passed cables, the entire cross-sectional area of each packing piece and forming upon compression of the block a continuous metal shield which is in electrically conducting contact with the frame, the stay strips and the cable casings.

5 Claims, 4 Drawing Figures

RADIATION PROTECTIVE DEVICE FOR THE LEAD-THROUGH OF CABLES

The present invention relates to a protective device for damping the passage of a pulsating, high-frequency electromagnetic radiation through a fire protecting leadthrough or transit intended for the accommodation of metal-encased electric cables with external insulation through an opening in a metal wall, said lead-through comprising a metal frame the opening of which is filled partly with modularly dimensioned packing pieces of which at least one is provided with through-holes for the passage of a cable; partly with stiffening metal plates or stay strips which are inserted between horizontal rows of packing pieces for stablizing the block formed by the packing pieces and which are in mechanical engagement with the frame; and partly an arrangement for the compression of said block.

It has been known for long that the atmospheric discharge created in thunderstorms, due to the electromagnetic radiation occurring in the form of a wave of short duration, can have seriously disturbing effects on the power network, the telecommunications and signal system, sometimes putting sensitive components out of order, or even causing their breakdown. In the last few decades however, observations have increasingly been made as to the devastating effects caused by nuclear discharge, resembling in many aspects this atmospheric discharge although involving more severe damages due to the higher degree of energy and frequency. A nuclear reaction produces an electromagnetic pulse, EMP in short, that is a very brief transient high-frequency wave giving rise to currents, and thereby voltages, of high magnitudes being induced in the cable network to which may be connected electronic units. Such units include semiconductor elements which are particularly sensitive to EMP and therefore easily broken down. While thunderstorms are more or less locally restricted, EMP is widely spread over very large areas, the destructive effect thereby being considerably more extensive.

To this end, attempts have been made to achieve protection against electromagnètic pulses of the EMP type, inter alia by embedment in the packing piece material of electrically charged particles of aluminum for example. Upon compression and deformation of the packing pieces, these particles are said to be displaceable in relation to each other while forming an electrically conductive shield. There are however no further details available whatsoever as to the shape, dimension and orientation of said particles, and therefore this shield-forming property seems unlikely to exist. On the other hand, there could hopefully at most occur a net with very irregular meshing, which would however constitute no protection against said EMP.

A lead-through of the kind mentioned by way of introduction, known from inter alia Swedish Patent Specification No. 152 815, lacks protection against all types of radiation, including EMP.

The invention is therefore based on the intention of developing a protective device for this type of lead-through which would effectively discharge the currents, induced in the cables by EMP, down to earth interrupting in this way the direct radiation through the frame while simultaneously being easy to design. The protective device is particularly intended for use in accommodating relatively weakly dimensioned cables for telecommunications and signaling purposes.

According to the invention, this object is accomplished in that the protective device is made of metal shield plates which are each introduced in its own individual packing piece in a plane parallel with the packing piece block, each shield plate associated with its respective through-bored packing piece having an opening adapted to the outer diameter of the cable casing and the edge of said opening being in electrically conductive engagement with the cable casing so that the shield plates, together with the passed-through cables, will cover the entire cross sectional area of each packing piece, forming upon compression of the block a continuous metal shield which is in electrically conductive connection with the frame, the stay strips and the cable casings.

Due to the protective device being designed as a continuous metal shield, the aforementioned disadvantages involving the formation of a net having larger or smaller meshes will be completely eliminated. Tests carried out have indicated a damping effect in the ratio of about 50000:1 between the potentials on the front, i.e. the side subjected to flames, of the lead-through and the rear side thereof, obtaining thereby completely harmless values for semiconductor components.

Figures 3, 4:
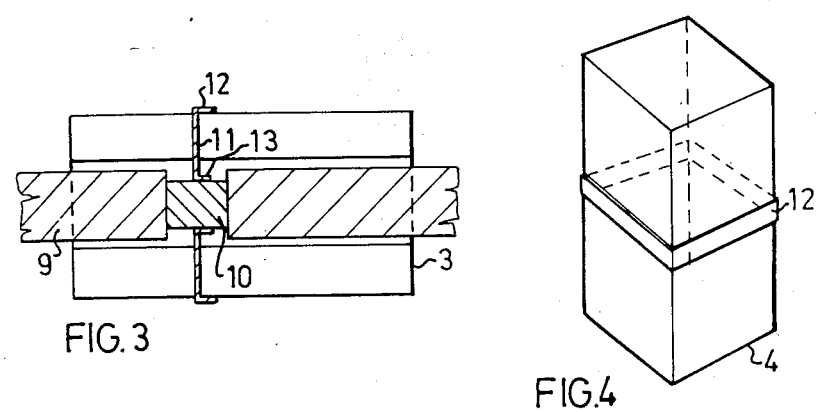

The invention will now be described in more detail while referring to the accompanying drawing, wherein FIG. 1 is a front view of a prior art lead-through on which the invention is applied, FIG. 2 is a cross-sectional view along the line II—II in FIG. 1, FIG. 3 is a view along the line III—III in FIG. 2, and FIG. 4 is a perspective view of a packing piece without through-holes for the accomodation of cables.

The lead-through illustrated in FIG. 1 comprises a frame 1 of metal which is secured, e.g. by welding, in an opening of a wall 2 made of steel and indicated at the bottom of FIG. 2, said frame defining in itself an opening which in a manner known per se is filled partly with modularly dimensioned packing pieces 3,4; partly with stay strips 5 of metal, disposed between rows of packing pieces and serving to stabilize the block formed of packing pieces 3,4; and partly with an arrangement for compressing said block and consisting of conventional components such as a press plate 6, an end seal 7 with clamping means 8 and apressing screw (not shown); all these parts being made of metal.

The packing pieces can either be so-called zero modules 4 which are not intended for the passage of cables and therefore have no through-bores for this purpose, or they can be packing pieces 3 provided with such bores. Said through-bores are formed of semi-circular recesses made in the surface of two packing piece halves of identical shape. A packing piece half of this kind with such a recess is illustrated more closely in FIG. 3. All packing pieces 3,4 consist to advantage of the type of material suggested in e.g. Swedish Patent Specification No. 176 057 and have specific fire protective characteristics.

According to the invention, the electric cables 9 shown in FIGS. 1–3 and intended for through-passage should be provided with an unbroken, and thus non-braided casing 10 of metal, usually lead or aluminum, which is normally enclosed in jackets for reinforcement and insulation. Said cables 9 are primarily intended to transmit control and information signals and are for this reason of comparatively small dimensions. Wherever heavier cable dimensions appear on the drawing, a larger scale has been used to better clarify the construction.

The stay strips 5 should furthermore be made of brass or some other metal having comparatively good conductivity.

In order now to achieve the desired damping of the pulsating radiation mentioned in the introduction, there is introduced according to the invention a shield plate of metal into each packing piece 3,4 in a plane parallel to the block of packing pieces such that the plate, together with the cable if applicable, will cover the entire cross-sectional area of each packing piece, creating in this way a continuous metal shield.

Each shield plate 11 is preferably made of brass and has a thickness in the order of tenths of a millimeter, and must be placed in a plane lying within the dimension of depth of the frame 1, i.e. the direction of the cables 9 through the frame opening.

To enable introduction of the shield plate 11 into a zero module 4, said module is divided into two halves along a plane perpendicular to the direction of the cables 9, the plate 11 thereafter being attached to the cut surface of one half by gluing or the like, the other half being similarly fixed to the plate. If the packing pieces are shorter, measured along the cables, compared to the depth of the frame, there is of course no need for such splitting.

The through-bored packing piece 3, consisting of two halves, is cut in the same manner as is the zero module 4. In this case the shield plate 11 associated with its respective packing piece half is provided with a semicircular cut-out adapted to the recess made in the corresponding packing piece and having a radius such that it projects into the recess of the packing piece 3, the edge thereof facing the cable 9 being bent to form a collar 13 which is intended for electrically conductive contact with the metal casing 10 of the cable 9, after removal of insulation, if any. This is shown in FIG. 3.

In order to obtain a safe, electrically conductive connection between the different shield plates 11, as well as contact with the stay strips 5 and the inside of the frame opening, the outer edge of the shield plates is furthermore bent so as to form a peripheral flange 12.

In order to additionally guarantee a satisfactory connection, the shield plate 11 for each half of a packing piece 3 has also its edge between the flanges 12,13, shown in FIG. 3 for example, bent into a flange which, upon assembly of the packing piece halves, will come into abutting engagement with a corresponding flange on the shield plate 11 of the other packing piece half.

As a result of this design of the shield plate 11 there is accomplished a continuous metal shield which is in electrically conducting engagement with the frame 1, the stay strips 5 and the metal casings 10 of the cables 9. The voltage caused by the appearance of an electromagnetic pulse is thus discharged to earth via the frame 1 and the wall 2.

In order to shorten the discharge paths, it is advisable to interlink the stay strips 5 with the aid of one or more connecting rods 14 as shown in FIGS. 1 and 2.

I claim:

1. Protective device for damping the passage of pulsating, high-frequency electromagnetic radiation through a fire-protecting transit accommodating metal-encased electric cables with exterior insulation led through an opening in a metal wall, said transit or lead-through comprising a metal frame having its opening filled partly with modularly dimensioned packing pieces of which at least one has through-holes for the passage of a cable, partly with stay strips of metal which are inserted between horizontal rows of packing pieces for stabilizing the block formed by the packing pieces and which are mechanically connected to the frame, and partly an arrangement for compressing said block, characterized by shield plates of metal which are each introduced in its own individual packing piece in a plane parallel with the packing piece block, each shield plate associated with its respective through-bored packing piece having an opening adapted to the outer diameter of the cable casing, the edge of said opening being in electrically conductive engagement with the cable casing so that the shield plates, together with the passed-through cables, cover the entire cross-sectional area of each packing piece, forming upon compression of the block a continuous metal shield which is in electrically conductive connection with the frame, the stay strips and the cable casings.

2. Device as claimed in claim 1, characterized in that each shield plate is bent along its outer edges to form a flange which is in electrically conductive engagement outside the packing piece with corresponding flanges on adjacent shield plates, with the stay strips and with the inner wall frame opening.

3. Device as claimed in claim 1, characterized in that the opening of each shield plate associated with its respective through-bored packing piece is thrust with its edge into the packing piece bore while being bent to form a collar-shaped flange which is in electrically conductive abutment with the cable casing after stripping off the exterior insulation therefrom.

4. Device as claimed in claim 1, characterized by one or more connecting rods of metal which provide for an electrically conductive interconnection of the stay strips.

5. In a fire protecting transit for use with an opening in a metal wall: a metal frame adapted to fit into an opening in the metal wall and to contact the periphery of the opening, said frame having an opening containing a plurality of block-shaped packing pieces of fire protective material arranged in horizontal rows one above the other with horizontal metal stay strips located between at least some of the rows of packing pieces and mechanically connected to said frame for stabilizing the assembly of packing pieces, at least one of the packing pieces having at least one horizontal through-hole through which passes a metal-encased electric cable having an exterior layer of insulation; and means for damping the passage of pulsating, high frequency electromagnetic radiation through the opening in the frame, said means including, for each packing piece, a metal shield plate disposed in a vertical plane perpendicular to the direction of the cable and coextensive with the entire cross-sectional area of its respective packing piece, the shield plate which is associated with said at least one packing piece having an opening through which the cable passes, the edge of said opening in said shield plate being in electrically conducting engagement with the metal casing of the cable, and each shield plate having flange portions at its edges overlying portions of the exterior surfaces of the respective packing piece, the flange portions being in electrically conducting engagement with corresponding flange portions of adjacent shield plates and with the metal stay strips and the flange portions associated with shield plates which are adjacent the sides of the opening in the frame being additionally in electrically conducting engagement with said sides.

* * * * *